US008804309B2

(12) United States Patent
Brandon et al.

(10) Patent No.: US 8,804,309 B2
(45) Date of Patent: *Aug. 12, 2014

(54) LOW TEMPERATURE DOUBLE-LAYER CAPACITORS USING ASYMMETRIC AND SPIRO-TYPE QUATERNARY AMMONIUM SALTS

(75) Inventors: Erik J. Brandon, Pasadena, CA (US); Marshall C. Smart, Studio City, CA (US); William C. West, South Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 186 days.

This patent is subject to a terminal disclaimer.

(21) Appl. No.: 13/006,385

(22) Filed: Jan. 13, 2011

(65) Prior Publication Data

US 2011/0170237 A1    Jul. 14, 2011

Related U.S. Application Data

(63) Continuation-in-part of application No. 12/134,128, filed on Jun. 5, 2008, now Pat. No. 8,081,418.

(60) Provisional application No. 61/294,785, filed on Jan. 13, 2010.

(51) Int. Cl.
*H01G 9/00* (2006.01)
*H01M 6/04* (2006.01)

(52) U.S. Cl.
USPC ........... 361/502; 361/503; 361/504; 361/505; 29/25.03

(58) Field of Classification Search
None
See application file for complete search history.

(56) References Cited

U.S. PATENT DOCUMENTS

| 7,091,156 B2 * | 8/2006 | Hirahara et al. | 502/416 |
| 7,436,651 B2 * | 10/2008 | Takeda et al. | 361/502 |
| 8,128,833 B1 * | 3/2012 | Smith et al. | 252/62.2 |
| 2002/0036884 A1 * | 3/2002 | Shimamoto et al. | 361/502 |
| 2003/0172509 A1 * | 9/2003 | Maletin et al. | 29/25.03 |
| 2004/0218346 A1 * | 11/2004 | Takeuchi et al. | 361/502 |
| 2007/0146968 A1 * | 6/2007 | Ohta et al. | 361/502 |

(Continued)

FOREIGN PATENT DOCUMENTS

| WO | WO 2005/088656 | * | 9/2005 | H01G 9/038 |
| WO | WO 2006/126721 | * | 11/2006 | H01G 9/00 |

OTHER PUBLICATIONS

Kotz, R., "Temperature behavior and impedance fundamentals of supercapacitors", J of Power Sources (2005) pp. 7462-7467.

(Continued)

*Primary Examiner* — Jayprakashn N Gandhi
*Assistant Examiner* — Dion R Ferguson
(74) *Attorney, Agent, or Firm* — Canady & Lortz LLP; Bradley K. Lortz

(57) ABSTRACT

Double-layer capacitors capable of operating at extremely low temperatures (e.g., as low as $-80°$ C.) are disclosed. Electrolyte solutions combining a base solvent (e.g., acetonitrile) and a cosolvent are employed to lower the melting point of the base electrolyte. Example cosolvents include methyl formate, ethyl acetate, methyl acetate, propionitrile, butyronitrile, and 1,3-dioxolane. A quaternary ammonium salt including at least one of triethylmethylammonium tetrafluoroborate (TEMATFB) and spiro-(1,1')-bipyrrolidium tetrafluoroborate ($SBPBF_4$), is used in an optimized concentration (e.g., 0.10 M to 0.75 M), dissolved into the electrolyte solution. Conventional device form factors and structural elements (e.g., porous carbon electrodes and a polyethylene separator) may be employed.

20 Claims, 9 Drawing Sheets

(56) References Cited

U.S. PATENT DOCUMENTS

| | | | |
|---|---|---|---|
| 2007/0194266 A1* | 8/2007 | Chiba | 252/62.2 |
| 2008/0003166 A1* | 1/2008 | Maletin et al. | 423/445 R |
| 2009/0086408 A1* | 4/2009 | Koh et al. | 361/502 |
| 2009/0103241 A1* | 4/2009 | Kikuchi et al. | 361/502 |

OTHER PUBLICATIONS

Gualous, H., "Experimental study of supercapacitor serial resistance and capacitance . . . temperature", J of Power Sources (2003) 123: 86-93.

Ratnakumar, B.V., "Lithium batteries for aerospace applications: 2003 Mars exploration rover", J of Power Sources (2003) pp. 906-910.

Shojah-Ardalan, S., "Susceptibility . . . irradiation" Radiation . . . Workshop, 2003 IEEE ISBN: 0-7803-8127-0 2003 pp. 89-91, and Electronics Web, White Paper: 2004 1pg Abstract.

Merryman, S., "Chemical double-layer capacitor Power Source for electromechanical thrust vector control actuator" J of Propulsion and Power (1996) 12:1 89-94.

Ue, M., "Electrochemical properties of organic liquid electrolytes based on quaternary . . . capacitors", J Electrochem. Soc. (1994) 141:11 2989-2996.

Janes et al., "Use of organic esters as co-solvents for electrical double layer capacitors with low temperature performance," J. Electroanal. Chem., vol. 588, 285-295 (2006).

Chiba et al., "Performance of electrolyte composed of spiro-type quaternary ammonium salt and electric double-layer capacitor using it," Echem., v.104, pp. 671-678, (2000).

Brandon et al., "Extending the low temperature operational limit of double-layer capacitors", J. Power Sources, vol. 170, pp. 225-232 (2007).

West et al., "Double-layer capacitor electrolytes using 1,3-dioxolane for low temperature operation," J. Electrochem. Soc., vol. 155, pp. A716-A720 (2008).

* cited by examiner

| Solvent | freezing point, °C | boiling point, °C | dielectric constant, ε | viscosity, cP |
| --- | --- | --- | --- | --- |
| acetonitrile | -45.7 | 81.60 | 37.5 | 0.345 |
| methyl formate | -100 | 32 | 8.5 | 0.319 |
| methyl acetate | -98 | 56.9 | 6.68 | 0.38 |
| 1,3-dioxolane | -95 | 78 | 7.3 | 0.6 |
| ethyl acetate | -83.6 | 77.1 | 6.0 | 0.426 |
| propylene carbonate | -49 | 241 | 69.0 | 2.51 |
| propionitrile | -92.8 | 97.4 | 29.7 | 0.294 |
| butyronitrile | -111.9 | 117.9 | 20.3 | 0.52 |
| triethylamine | -114.7 | 89.3 | 2.4 | 0.36 |

FIG. 2A

| Co-solvent | acetonitrile:co-solvent ratio | freezing point, °C |
|---|---|---|
| 1,3-dioxolane* | 1:1 | -85.6 |
| propionitrile | 1:1 | -84.4 |
| ethyl acetate | 3:1 | -72.0 |
| methyl formate | 3:1 | -71.0 |
| methyl acetate | 3:1 | -70.0 |
| 1,3-dioxolane* | 3:1 | -67.9 |
| triethylamine | 3:1 | -62.3 |

*contains 2% by volume triethylamine stabilizer

FIG. 2B

| Co-solvent | AN/co-solvent ratio (vol/vol%) | Minimum temperature linear DC discharging observed (coin cell double-layer capacitor)* | Electrolyte concentration (TEATFB salt) |
|---|---|---|---|
| methyl formate | 3:1 | -60°C | 0.500 M |
| methyl formate | 1:1 | -80°C | 0.250 M |
| methyl acetate | 3:1 | -65°C | 1.000 M |
| ethyl acetate | 3:1 | -60°C | 1.000 M |
| 1,3-dioxolane | 3:1 | -75°C | 0.750 M |
| 1,3-dioxolane | 1:1 | -70°C | 0.500 M |
| propionitrile | 1:1 | -80°C | 0.250 M |
| butyronitrile | 1:1 | -70°C | 0.250 M |

*1 mA discharge current, between 2 and 1 V

FIG. 3

LOW TEMPERATURE DOUBLE-LAYER CAPACITORS USING ASYMMETRIC AND SPIRO-TYPE QUATERNARY AMMONIUM SALTS

CROSS-REFERENCE TO RELATED APPLICATIONS

This continuation-in-part application claims the benefit under 35 U.S.C. §120 of the following co-pending and commonly-assigned U.S. utility patent application, which is incorporated by reference herein:

U.S. patent application Ser. No. 12/134,128, filed Jun. 5, 2008, by Brandon et al. and entitled "LOW TEMPERATURE DOUBLE-LAYER CAPACITORS,".

This application claims the benefit under 35 U.S.C. §119 (e) of the following U.S. provisional patent application, which is incorporated by reference herein:

U.S. Provisional Patent Application No. 61/294,785, filed Jan. 13, 2010, and entitled "USE OF ASYMMETRIC AND SPIRO-TYPE QUATERNARY AMMONIUM SALTS FOR IMPROVED WIDE TEMPERATURE PERFORMANCE OF DOUBLE-LAYER CAPACITORS", by Brandon et al.

STATEMENT OF GOVERNMENT RIGHTS

The invention described herein was made in the performance of work under a NASA contract, and is subject to the provisions of Public Law 96-517 (35 U.S.C. 202) in which the Contractor has elected to retain title.

BACKGROUND OF THE INVENTION

1. Field of the Invention

This invention relates to electrical double-layer capacitors. Particularly, this invention relates to low temperature electrical double-layer capacitors using asymmetric and/or spiro-type quaternary ammonium salts.

2. Description of the Related Art

The storage of electrical energy and delivery of electrical power at low temperatures is difficult to achieve. In part, this is because most typical energy storage technologies, such as chemical batteries, utilize electrochemical processes which are highly temperature dependent and cannot provide high currents at lower temperatures. Thus, chemical batteries in cold environments must typically be maintained at a temperature higher than the ambient environment (requiring additional mass and/or power dedicated to thermal management). Alternately, a chemical battery may be oversized to compensate for the compromised low temperature power density. In addition, other power sources such as radioisotope thermoelectric generators cannot provide high power levels. Applications involving extremely cold environments, e.g., space and Arctic conditions, require solutions to deliver adequate electrical power while mitigating the weaknesses of conventional solutions, e.g., additional mass and/or system complexity.

Such double-layer capacitors (also known as supercapacitors or electrochemical capacitors) combine the high power density (e.g., approximately 1,000 W/kg) provided by electrolytic capacitors with a moderate energy density (e.g., approximately 5-10 Wh/kg), enabling very high current pulses to be delivered for short bursts of time, or alternatively a very low current for extended periods of operation. Due to the unique mechanism of charge storage (i.e., the double layer formed at a solid/liquid interface), cycle life is nearly infinite (i.e., greater than $10^6$ cycles). Despite these favorable attributes, commercially available components employing non-aqueous electrolytes (e.g., from Maxwell Technologies or Cooper Bussman, two leading suppliers of double-layer capacitors) are generally limited to operation at temperatures greater than −40° C. due to the relatively high freezing point of the standard electrolytes used. Operation to at least −55° C. (where most space-rated avionics are required to operate) is necessary to allow these components to be easily integrated with existing space avionics.

FIG. 1 is a schematic diagram of a conventional double-layer capacitor 100. The double-layer capacitor 100 comprises two electrical layers 102A, 102B. Each layer 102A, 102B includes a porous electrode 106A, 106B, typically carbon. Note that each porous electrode 102A, 102B in FIG. 1 appears as multiple separate particles, however, the particles are interconnected in a "sponge-like" structure as will be understood by those skilled in the art. A chemical electrolyte solution 108 fills each layer in the interstices of the porous electrodes 106A, 106B. The chemical electrolyte solution 108 typically comprises a salt, such as tetraethylammonium tetrafluoroborate (TEATFB), dissolved in propylene carbonate or acetonitrile. The layers 102A, 102B are isolated from each other by a separator 110 that is both ionically conducting and electrically insulating to the electrolyte solution 108. A voltage differential across opposite ends of each layer 102A, 102B (from conductive contacts to each porous electrode 106A, 106B) induces a positive charge in one porous electrode 106A and a negative charge in the other porous electrode 106B which attract negative ions 104A and positive ions 104B of the electrolytes solution 108 to each electrode 106A, 106B, respectively. In each layer, energy storage is obtained by the charge separation between respective ions 104A, 104B in the electrolyte solution 108 and the surfaces of the porous electrodes 106A, 106B. The porous structure of the electrodes 106A, 106B, providing a very high effective surface area (e.g., greater than 1000 $m^2/g$), coupled with the extremely short (molecular level) effective charge separation between the ions and those surfaces, yields a high energy density for the double-layer capacitor 100.

Due to their high power density, simple construction and near infinite cycle life, double-layer capacitors have been considered for applications where very high current pulses need to be delivered in extreme environments, such as under high G-loading or in high radiation conditions. See, Conway, "Electrochemical Double-layer capacitors: Scientific Fundamentals and Technological Applications," New York: Kluwer-Plenum, 1999; Merryman et al., "Chemical double-layer capacitor power source for electromechanical thrust vector control actuator," J. Propulsion Power, vol. 12, 89-94 (1996); and Shojah-Ardalan et al., "Susceptibility of ultracapacitors to proton and gamma irradiation," 2003 IEEE Radiation Effects Data Workshop Conference Proceedings, 89-91 (2003).

Despite the relatively rugged nature of double-layer capacitors, wide temperature operation is usually not possible, with −40° C. representing the typical lower rated limit for commercially available non-aqueous off-the-shelf parts. However, the need for energy storage and power delivery technologies that can operate at low temperatures is of great interest for space exploration applications. This need has led to the successful development of low temperature lithium ion batteries in recent years. See, Ratnakumar et al., "Lithium batteries for aerospace applications: 2003 Mars Exploration Rover," J. Power Sources, vol. 119-121, 906-910 (2003). In order for currently available double layer capacitors to find use in space avionics, they would require special thermal control apart from the rest of the electronic subsystems, since most space rated electronics can operate to at least the −55° C. limit. Aqueous double-layer capacitors which can operate to −55° C. are available, however, the theoretical energy density of these components is a factor of five lower than non-aqueous cells, due to the lower operating voltage.

Some double-layer capacitors have been characterized extensively down to −40° C., mainly to study fundamental electrode processes and characterize leakage phenomena. See, Gualous et al., "Experimental study of double-layer capacitor serial resistance and capacitance variations with temperature," J. Power Sources, vol. 123, 86-93 (2003); Kotz et al., "Temperature behavior and impedance fundamentals of double-layer capacitors," J. Power Sources, vol. 154, 550-555 (2006); and Janes et al., "Use of organic esters as co-solvents for electrical double layer capacitors with low temperature performance," J. Electroanal. Chem., vol. 588, 285-295 (2006) (Janes). These data indicate that down to −40° C., the performance is acceptable for a range of applications. However, there is a dearth of data for double-layer capacitors below this temperature limit, limited by the high melting point of the solvents used in commercially available cells (typically, propylene carbonate or acetonitrile). Double-layer electrochemical capacitors may be potentially attractive to operate at low temperature, because diffusion of ions occurs over very short distances, unlike batteries. The most significant challenges in designing double-layers capacitors for low temperature operation are to suppress the melting point of the electrolyte to below the desired operating temperature, to maintain solubility of the salt in the electrolyte solution at low temperatures, and to minimize increases in equivalent series resistance due to increased solvent viscosity accompanying the reduced temperatures.

In view of the foregoing, there is a need in the art for apparatuses and methods of producing double-layer capacitors capable of operating at extremely low temperatures, e.g. at or below −40°. There is also a need for such apparatuses and methods employing electrolytes that avoid freezing, maintain salt solubility and mitigate the increase in equivalent series resistance (ESR) due to increases in solvent viscosity at low temperature. There is particularly a need for such apparatuses and methods in space applications to eliminate the need for additional system complexity, e.g., special thermal control, and without requiring additional mass for the energy storage. These and other needs are met by the present invention as detailed hereafter.

SUMMARY OF THE INVENTION

Double-layer capacitors capable of operating at extremely low temperatures (e.g., as low as −80° C.) are disclosed. Electrolyte solutions combining a base solvent (e.g., acetonitrile) and a cosolvent are employed to lower the melting point of the base electrolyte. Example cosolvents include methyl formate, ethyl acetate, methyl acetate, propionitrile, butyronitrile, and 1,3-dioxolane. A quaternary ammonium salt including at least one of triethylmethylammonium tetrafluoroborate (TEMATFB) and spiro-(1,1')-bipyrrolidium tetrafluoroborate ($SBPBF_4$), is used in an optimized concentration (e.g., 0.10 M to 0.75 M), dissolved into the electrolyte solution. Conventional device form factors and structural elements (e.g., porous carbon electrodes and a polyethylene separator) may be employed.

A typical embodiment of the invention comprises a double-layer capacitor apparatus including a first porous electrode for conducting a charge, a second porous electrode for conducting an opposing charge, an electrolyte solution soaking the first electrode and the second electrode to enable formation of an electrical double-layer at interfaces of both the first porous electrode and the second porous electrode with the electrolyte solution and thereby exhibit a dielectric interaction between charged surfaces of the first porous electrode and the second porous electrode and ions of the electrolyte solution, and a separator disposed between the first porous electrode and the second porous electrode, the separator allowing for conduction of the ions while electrically insulating the first porous electrode and the second porous electrode. The electrolyte solution comprises a quaternary ammonium salt including at least one of triethylmethylammonium tetrafluoroborate (TEMATFB) and spiro-(1,1')-bipyrrolidium tetrafluoroborate ($SBPBF_4$) dissolved into at least a base solvent and a second solvent for reducing a melting point of the base solvent. The quaternary ammonium salt may comprise a mixture of TEMATFB and $SBPBF_4$.

In some embodiments of the invention, the base solvent comprises acetonitrile (AN) and the second solvent comprises either an organic carbonate, ether, formate, ester or substituted nitrile. Further, the base solvent and the second solvent may each be selected from the cosolvents consisting of acetonitrile (AN), propylene carbonate, methyl formate (MF), ethyl acetate (EA), methyl acetate (MA), propionitrile (PN), butyronitrile (BN), and 1,3-dioxolane (DX). The base solvent and the second solvent in the electrolyte solution may be mixed over a wide range of ratios, with the optimal performance typically provided by blends comprised of approximately 50% by volume base solvent. A desirable mixture range for the electrolyte solution comprises substantially a 30% to a 70% base solvent volume. The quaternary ammonium salt may have a concentration of substantially 0.10 M to substantially 0.75 M in the electrolyte solution.

In some embodiments of the invention, where the second solvent comprises 1,3-dioxolane, the electrolyte solution may further comprise a small concentration of triethylamine (TEA) (e.g., approximately 2% by volume). However, 1:1 AN:MF or 1:1 AN:PN yield superior performance in terms of lower ESR at low temperatures.

Typically, the porous electrodes may comprise a carbon material, such as approximately 20% binder, 80% activated carbon. The separator may comprise polyethylene.

In a similar manner, a typical method embodiment of the invention for producing a double-layer capacitor comprises disposing a first porous electrode for conducting a charge and a second porous electrode for conducting an opposing charge in a case, preparing an electrolyte solution comprising a quaternary ammonium salt including at least one of triethylmethylammonium tetrafluoroborate (TEMATFB) and spiro-(1, 1')-bipyrrolidium tetrafluoroborate ($SBPBF_4$) dissolved into at least a base solvent and a second solvent for reducing a melting point of the base solvent, disposing a separator between the first porous electrode and the second porous electrode, the separator allowing for conduction of ions while electrically insulating the first porous electrode and the second porous electrode, and soaking the first electrode and the second electrode with the electrolyte solution in the case to enable formation of an electrical double-layer at interfaces of both the first porous electrode and the second porous electrode with the electrolyte solution and thereby exhibit a dielectric interaction between charged surfaces of the first porous electrode and the second porous electrode and the ions of the electrolyte solution. Method embodiments of the invention may be further modified consistent with the apparatus embodiments described herein.

In addition, embodiments of the invention may encompass an apparatus, comprising a first porous electrode means for conducting a charge, a second porous electrode means for conducting an opposing charge, an electrolyte solution means for soaking the first electrode means and the second electrode means to enable formation of an electrical double-layer at interfaces of both the first porous electrode means and the second porous electrode means with the electrolyte solution means and thereby exhibit a dielectric interaction between charged surfaces of the first porous electrode means and the second porous electrode means and ions of the electrolyte solution means, and a separator means disposed between the first porous electrode means and the second porous electrode means, the separator means for allowing conduction of the ions while electrically insulating the first porous electrode means and the second porous electrode means. The electrolyte solution means comprises a quaternary ammonium salt including at least one of triethylmethylammonium tetrafluoroborate (TEMATFB) and spiro-(1,1')-bipyrrolidium tetrafluoroborate ($SBPBF_4$) dissolved into at least a base solvent and a second solvent means for reducing a melting point of the base solvent. Apparatus embodiments of the invention may be further modified consistent with other embodiments described herein.

BRIEF DESCRIPTION OF THE DRAWINGS

Referring now to the drawings in which like reference numbers represent corresponding parts throughout:

FIG. 2A is a table of physical properties for exemplary solvents employed in double-layer capacitor embodiments of the invention;

FIG. 2B is a table of melting points for solvent mixtures comprising a first solvent of acetonitrile and various second solvents;

FIG. 3 is a table of minimum temperature at which dc discharging and double-layer capacitance can be observed for example TEATFB salts;

DETAILED DESCRIPTION OF THE PREFERRED EMBODIMENT

1. Overview

Figure 1:
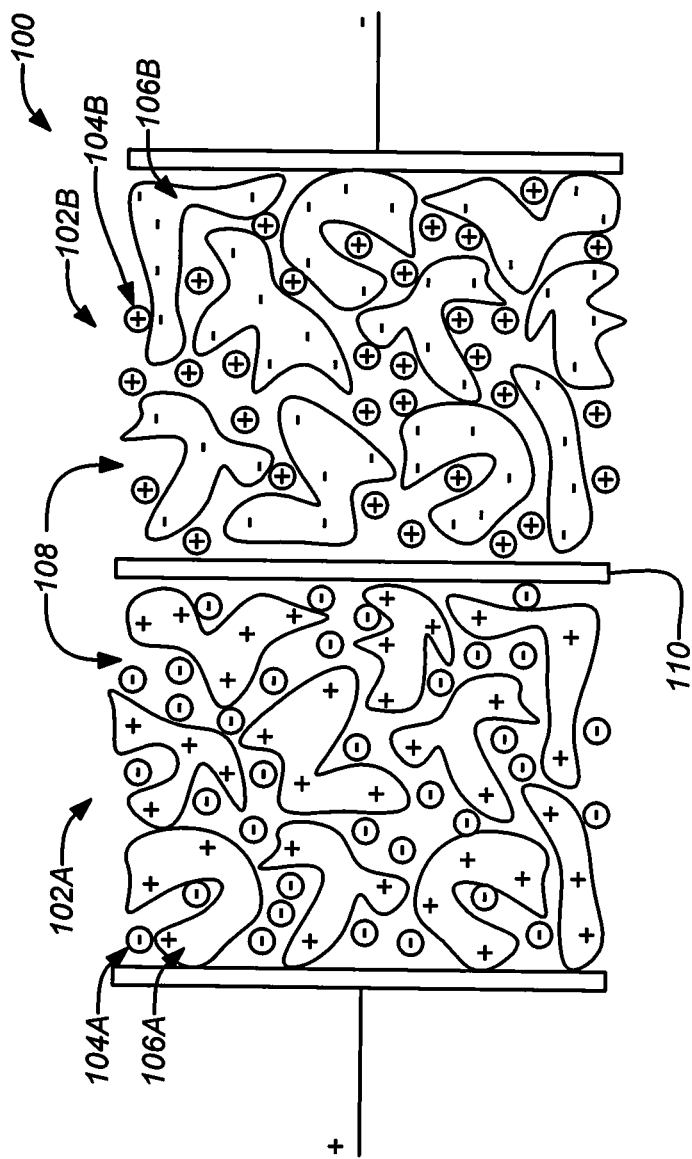
FIG. 1 is a schematic diagram of a conventional double-layer capacitor.

As previously mentioned, embodiments of the invention are directed to non-aqueous double-layer capacitors having an electrolyte system that operates below −40° C. and delivering useful cell characteristics such as capacitance and low ESR at these lower temperatures. This work may lend a greater understanding of fundamental cell processes (such as current leakage and the nature of the double layer), as well as lead to a practical device for low temperature operation in future space exploration robotic missions. Extension of the operating temperature to at least −55° C. (the required lower operating temperature limit for most space rated electronics) would make these components more appealing for space applications.

Some potential space applications for such double-layer capacitors include augmenting high specific energy, low temperature primary battery cells or in designing hybrid capacitor-secondary battery cell systems to extend cell life in robotic space missions. Another potential application is for a "capacitor only" power supply for distributed sensor networks, where low temperatures are encountered and batteries are difficult to replace (e.g., on other planetary surfaces or in Arctic monitoring stations).

Pure propylene carbonate (PC) and acetonitrile (AN) are used as electrolyte solvents in commercially available double-layer cells. Since the melting point of both pure PC and pure AN is slightly below −40° C., commercially available cells are operational to as low as −40° C. without the addition of any co-solvents. Between room temperature and −40° C., however, there are increases in ESR of these commercially available cells, due to increases of solvent viscosity with temperature (which decreases the mobility of conductive ions in the electrolyte, thereby increasing the resistance of the electrolyte). Previous work (e.g., Janes) has focused on addressing this issue, through the addition of co-solvents to offset these increases in viscosity (with lower viscosity co-solvents) and to thereby improve cell performance between room temperature and −40° C.

In contrast, the teaching of the current disclosure focuses on the use of co-solvents to suppress the melting point of non-aqueous electrolyte systems to below the −40° C. threshold, as well as to maintain adequate performance of the cell (i.e., suitable capacitance and low ESR) at these very low temperatures). This may be accomplished through the use of acetonitrile as the base solvent, through the judicious choice of co-solvent (with the proper melting point and dielectric constant), through the correct choice of base to co-solvent ratio, and through the proper choice of salt concentration. The goal is to suppress the melting point to below the operational temperature, minimize increases in resistance and maintain salt solubility at very low temperatures (i.e., maintain an electrolyte solution at less than −40° C.).

To enable operation of double-layer capacitors at temperatures less than −40° C., embodiments of the present invention implement a new electrolyte system, chiefly with regard to the solvents employed. The main approach described herein involves the use of cosolvents to depress the melting point of an acetonitrile (AN) solvent and an electrolyte system comprising a quaternary ammonium salt including at least one of triethylmethylammonium tetrafluoroborate (TEMATFB) and spiro-(1,1')-bipyrrolidium tetrafluoroborate ($SBPBF_4$). One approach utilizes selected carbonate, formate, ether, ester or substituted nitrile cosolvents resulting in a depression of the base solvent melting point. In addition, the new solvent system must be used in concert with an appropriate electrode material which is capable of exhibiting a suitable energy density.

An additional challenge in choosing appropriate co-solvents is consideration of the dielectric constant of this component. Since most suitable solvents with low melting points also possess a lower dielectric constant than the base solvent (acetonitrile), the ability of the salt to maintain solubility at low temperatures will be compromised. Thus, within the bounds of suppressing the melting point to below the desired operating temperature, a solvent with the highest possible dielectric constant should be chosen. Once the co-solvent is selected, the actual melting point and dielectric constant of the blend will then depend on the volumetric ratio of base solvent to co-solvent. The dielectric constant of this final chosen blend will influence the maximum salt concentration that can be achieved, which in turn will influence the ESR of the cell.

Various embodiments of the invention may employ a range of different electrolytes. Coin cells serve as a convenient platform to evaluate the performance of specific electrolyte systems, using porous high surface area carbon electrode materials electrically isolated by a polyethylene separator material. In many cases, room temperature capacitance values are nearly maintained even at the lowest measured temperatures. Note that throughout this disclosure various electrolyte solutions may be readily referenced in the following format X M AA Y:Z BB:CC, where X is the concentration (molarity) of salt AA dissolved into a solvent blend of BB and CC mixed in a volume ratio of Y parts BB to Z parts CC.

In addition, various 1:1 by volume (i.e., 50% base solvent volume) electrolyte blends have also been considered using acetonitrile as the first solvent combined with cosolvents such as 1,3-dioxolane, methyl acetate, ethyl acetate, methyl formate, propionitrile and butyronitrile. (An optimal mixture range may be considered 30% to 70% base solvent volume.) Cells incorporating solvents selected from this list of blends have exhibited double-layer capacitance as low as −100° C. The ESR of the double-layer capacitors is influenced by the concentration of the salt and the nature of the cosolvent, with the methyl formate blend providing the lowest ESR values. Ionic compounds such as tetraethylammonium tetrafluoroborate serve as suitable salts for the electrolyte solution. Although salt concentrations in the 0.1 to 1.5 M range may be employed, optimal performance occurs when the concentration of the salt is in the range of 0.10 to 0.75 M.

2. Electrolyte Cosolvents

Electrolyte solutions and electrode materials may be selected to obtain a double-layer capacitor which can operate at temperatures below commercially available cells while still exhibiting a suitable energy and power density. Electrolyte solutions used in conventional double-layer capacitors typically employ either propylene carbonate or acetonitrile as the solvent, in conjunction with a salt such as TEATFB (or other similar substituted quaternary ammonium salts). In terms of commonly employed non-aqueous electrolyte systems, acetonitrile formulations combine a relatively high conductivity with a high room temperature salt solubility and a wide electrochemical window, and therefore represent a suitable starting point for low temperature electrolyte design. See, Ue et al., "Electrochemical properties of organic liquid electrolytes based on quaternary onium salts for electrical double-layer capacitors," Electrochem. Soc., vol. 141, 2989-2996 (1994). If 0.75 to 1 M TEATFB electrolyte solutions are used, the melting point extends to about −45° C.

Embodiments of the invention employ a technique to achieve melting point depression beyond this limit through the formulation of cosolvent systems (e.g., binary solvent systems), in which appropriate low melting cosolvents may be blended with the primary acetonitrile component. The key challenges are to achieve the maximum melting point depression while maintaining high salt solubility, low solution viscosity and favorable dielectric properties to the lowest achievable temperature limit.

FIG. 2A is a table of physical properties for some exemplary solvents employed in double-layer capacitor embodiments of the invention. Based on their favorable electrochemical properties in low temperature battery work, organic carbonates, ethers, esters, formates and nitriles may be considered as possible cosolvent candidates to form low temperature binary solvent systems.

FIG. 2B is a table of melting points for solvent mixtures comprising a first solvent of acetonitrile and various second solvents. As a first step in developing some optimum low temperature solvent systems, the melting point of several candidate binary solvent systems can be experimentally determined. The table of FIG. 2B shows several representative blends of organic carbonates or cyclic ethers with acetonitrile (no TEATFB salt) and the melting point measured by the differential scanning calorimetry.

Preparation of electrolyte solutions and cell assembly operations may be conducted in an argon filled glovebox, or other similar dry, inert atmosphere. Those skilled in the art will appreciate that the described electrolyte systems may be implemented with any other known double-layer capacitor assembly processes and hardware configurations as well. Electrolyte solutions can be prepared by dissolving tetraethylammonium tetrafluoroborate (TEATFB) at room temperature in the appropriate high purity or battery grade binary solvent system. Solvents such as acetonitrile (AN), methyl formate (MF), ethyl acetate (EA), methyl acetate (MA), propionitrile (PN), butyronitrile (BN) and 1,3-dioxolane (DX) may be employed. When DX is employed as a cosolvent, approximately 2% by volume triethylamine (TEA) may be added to prevent acid catalyzed polymerization of the ether.

3. Exemplary Double-Layer Capacitor Cell Assembly

Double-layer capacitors may be prepared from a wide variety of high-surface area (e.g., typically greater than 1000 $m^2/g$), porous carbon electrodes. Example carbon electrode materials which have been used in conjunction with the modified electrolytes to demonstrate cells operational at low temperatures include PACMM203 (Material Method) and Spectracarb 2225 (Spectracorp). In the coin cell configuration, electrodes are typically metalized with a thin layer of evaporated or sputtered Pt, to minimize contact resistance between the electrode and cell casing.

The two carbon electrodes may be electrically isolated from one another using an ionically conducting, electrically insulating separator. These separators are typically fabricated from polyethylene 20 micron thick. A 20 micron thick Tonen-Setella separator has been used in conjunction with the modified electrolytes to demonstrate cells operational at low temperatures. Cells may be filled with the selected electrolyte solution comprising the cosolvent blend, and an anode shim and wave spring placed in the cell to hold the electrode assembly firmly in place upon hermetic sealing. For electrochemical impedance measurements, nickel contacts may be spot welded onto the coin cell casing to minimize contacting issues with the test leads. Cells may also be sealed with epoxy to prolong the hermetic seal of the cell.

In one example double-layer capacitor, a 2032 form factor coin cell is utilized, with each single electrode approximately 1.6 cm in diameter, 0.30 mm thick, with a typical mass of approximately 0.024 g for a total cell electrode volume and mass (sum of both electrodes) of 0.12 $cm^3$/cell and 0.048 g/cell of active material.

4. Performance Characteristic Measurement

To determine the cell characteristics at low temperature, double-layer capacitor cells may be charged at a constant current of 1 mA to an open circuit voltage ($V_{oc}$) of about 2.5 V. Cells may then be discharged at the respective current, and the slope of the discharge curve determined between 2 and 1 V. From this slope, the capacitance can be derived from C=I (dV/dt), where C is capacitance, I is the discharge current and t is the time to discharge from 2 to 1 V. A decreasing linear voltage versus time upon discharge is anticipated for an operational double-layer capacitor with a stable electrolyte system. FIG. 3 indicates the minimum temperature at which a linear DC discharge was achieved from some exemplary solvent blends for example TEATFB salts. Typical room temperature cell capacitances as extracted from the dV/dt curves for these test cells was approximately 0.99 Farads/cell. In some cases, the full room temperature capacitance was maintained at the lowest operational temperature (such as for the AN:MF blends). As shown in FIG. 3, some cells could still be discharged with a DC current down to −80° C. In the case of the AN:MF blends, the full room temperature capacitance was observed down to −80° C. All cells could be discharged below the limit of commercially available non-aqueous double-layer capacitor cells.

Figure 4:
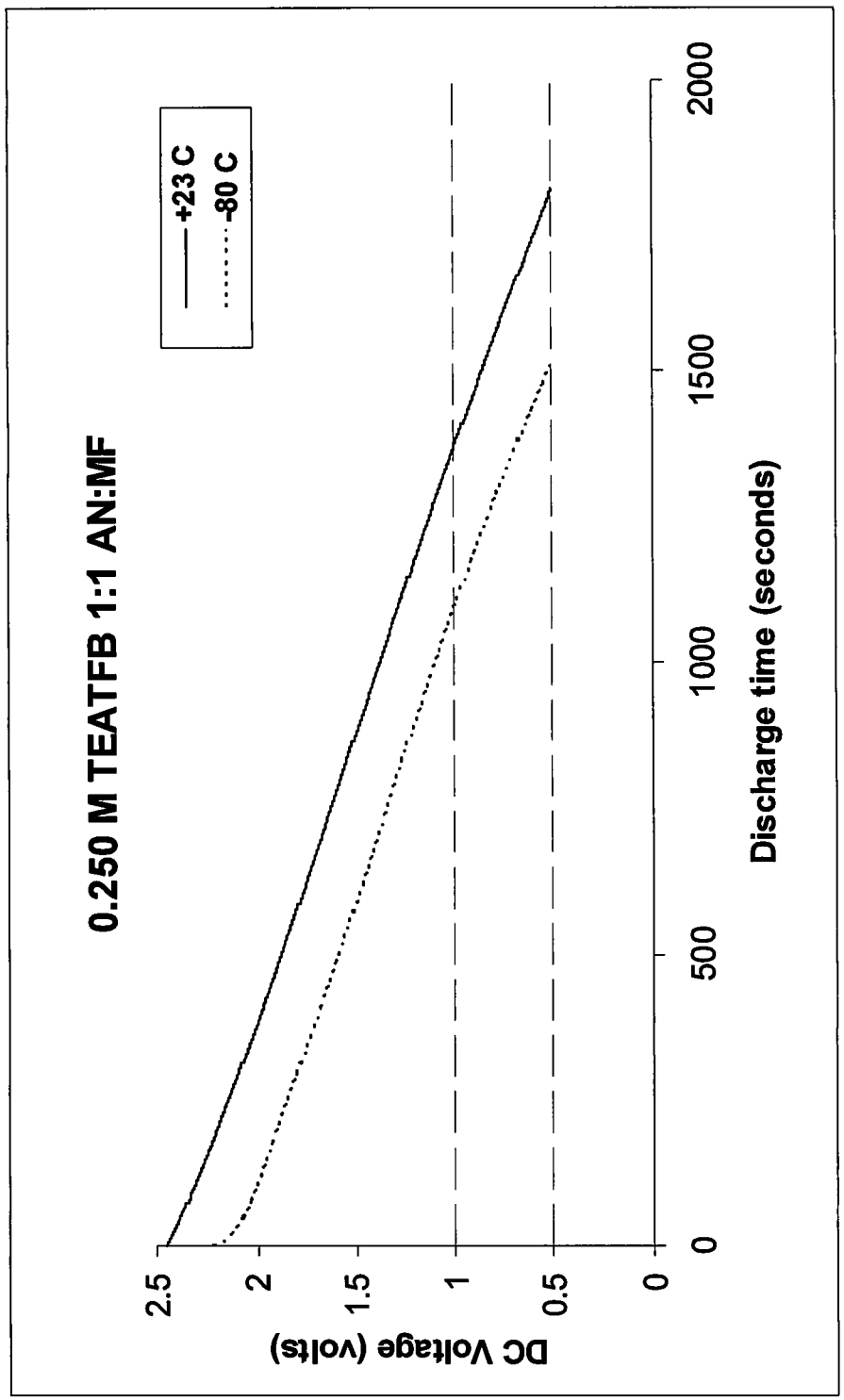
FIG. 4 is a plot of representative dc discharging data at room temperature at −80° C. for a cell employing a modified low temperature example electrolyte of 1:1 AN:MF.

Representative DC discharge data is depicted in FIG. 4 at room temperature and at −80° C., for the example 0.250 M TEATFB 1:1 AN:MF blend, which represents one of the most optimal blends investigated. As shown, the slope of the dV/dt is essentially the same in both cases, indicating no degradation in capacitance at this temperature. The capacitance extracted from each of these curves is approximately 1 Farad. The offset in discharge voltages observed at the y-axis is indicative of the increased ESR at low temperatures.

Figure 5A:
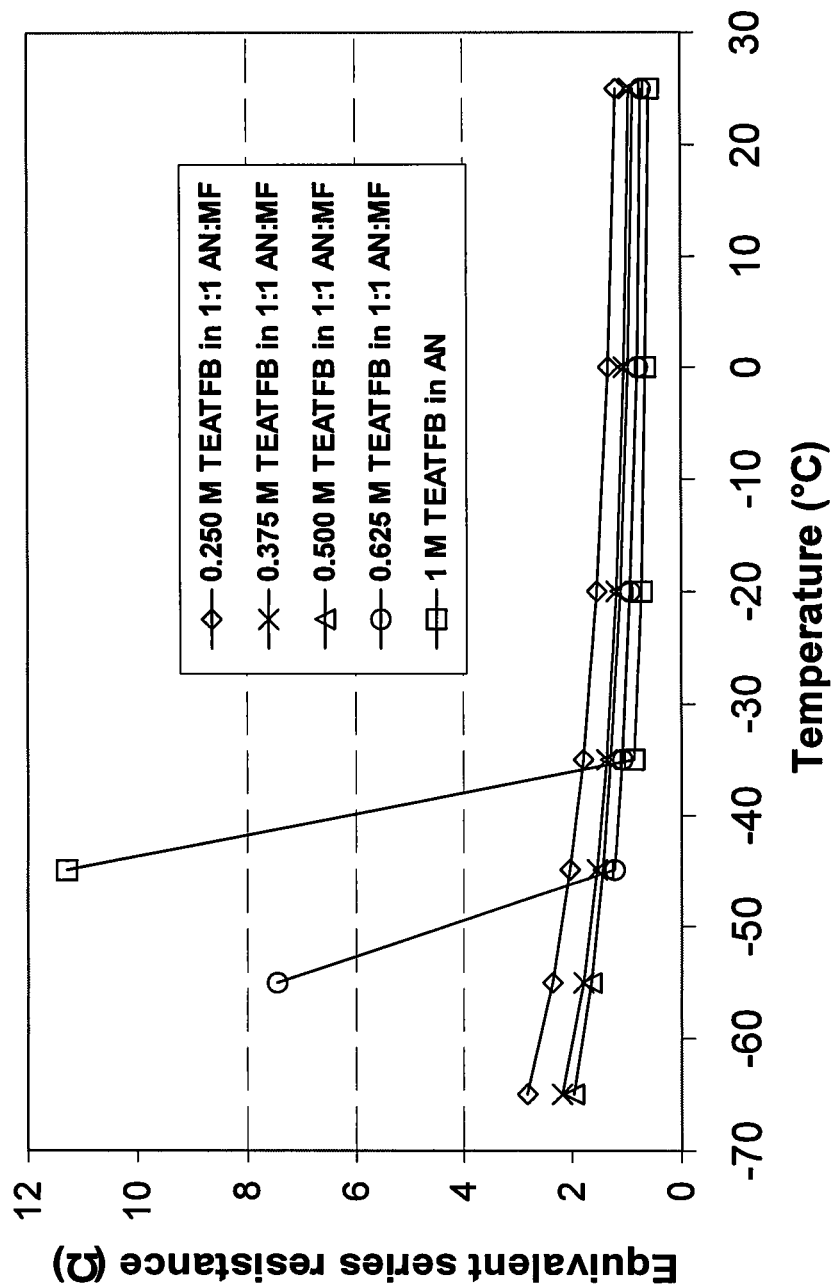
FIG. 5A is a plot of ESR versus temperature for a representative modified low temperature electrolyte over a range of salt concentrations.

In addition, impedance measurements may be performed and the equivalent series resistance (ESR) of the cell extracted from the impedance data. Representative cell data for 1:1 AN:MF blends at four different cell concentrations is depicted in FIG. 5A. For blends in the 0.250 to 0.500 M concentration range, a slight decrease in ESR is observed at all temperatures, due to the increased solution conductivity resulting from an increased number of conductive ions in solution. Those skilled in the art will note the observed ESR increases only moderately, and is clearly superior to commercially available non-aqueous cells at very low temperature. An increase in ESR is observed as the 0.625 M concentration is reached, however. This may be indicative of a precipitation process, as the solubility limit of TEATFB in the 1:1 AN:MF blend is apparently reached between a 0.500 and 0.625 M concentration.

Thus, to achieve an optimal cell performance at room temperature, it is critical to choose the appropriate co-solvent with optimal melting point and dielectric constant (such as those listed in FIGS. 2A & 2B), to achieve the correct solvent ratio (in these examples, a 1:1 ratio of solvent to co-solvents provides superior performance to the 3:1 blends), as well as to select the proper salt concentration (which much be within the solubility limits of the given solvent blend at the minimum observed operational temperature). Several of the blends and cell data presented herein demonstrate this approach to electrolyte design, which was used to identify the appropriate formulations. Cells using the AN:MF blends displayed the lowest ESR over the widest range of temperatures. However, AN:PN blends displayed similarly low ESR values at low temperatures, and may be preferred in some applications due to their higher boiling points.

5. Asymmetric and Spiro-Type Quaternary Ammonium Salts

As previously discussed, the addition of low melting point co-solvents to a base acetonitrile solvent can extend the low temperature operational limit of double-layer capacitors beyond that of commercially available cells. It has been shown that although the measured capacitance is relatively insensitive to temperature, the ESR can rise rapidly at low temperatures, due to decreased electrolyte conductance within the pores of the carbon electrodes. Most of these innovative electrolyte systems featured tetraethylammonium tetrafluororborate (TEATFB) as the salt as described above. Further development indicates the use of the asymmetric quaternary ammonium salt triethylmethylammonium tetrafluoroborate (TEMATFB) or spiro-(1,1')-bipyrrolidium tetrafluoroborate ($SBPBF_4$) in an example 1:1 by volume solvent mixture of acetonitrile (AN) and methyl formate (MF) can enable further improved double-layer capacitors cells to be constructed which display a low ESR at temperatures beyond the operational limit of the innovative cells using baseline pure AN solvents. Other suitable solvent mixtures may also be acceptable. Thus, these quaternary ammonium salts can provide even lower ESR than the TEATFB salts discussed herein.

Exemplary double-layer capacitor coin cells filled with these electrolytes can exhibit extremely low ESRs at low temperature, based on a range of electrolyte screening. The exemplary cells feature high surface area (~2,500 $m^2/g$) carbon electrodes that may be approximately 0.50 mm thick and 1.6 cm in diameter, and coated with a thin layer of platinum to reduce cell resistance. A polyethylene separator was used to electrically isolate the electrodes. Other suitable metals may also be used to reduce contact resistance as will be understood by those skilled in the art. Some examples of cell construction are described in the next section. Those skilled in the art will appreciate embodiments of the invention may be implemented using any known double-layer capacitor structural configuration as will be understood by those skilled in the art.

Figure 5B:
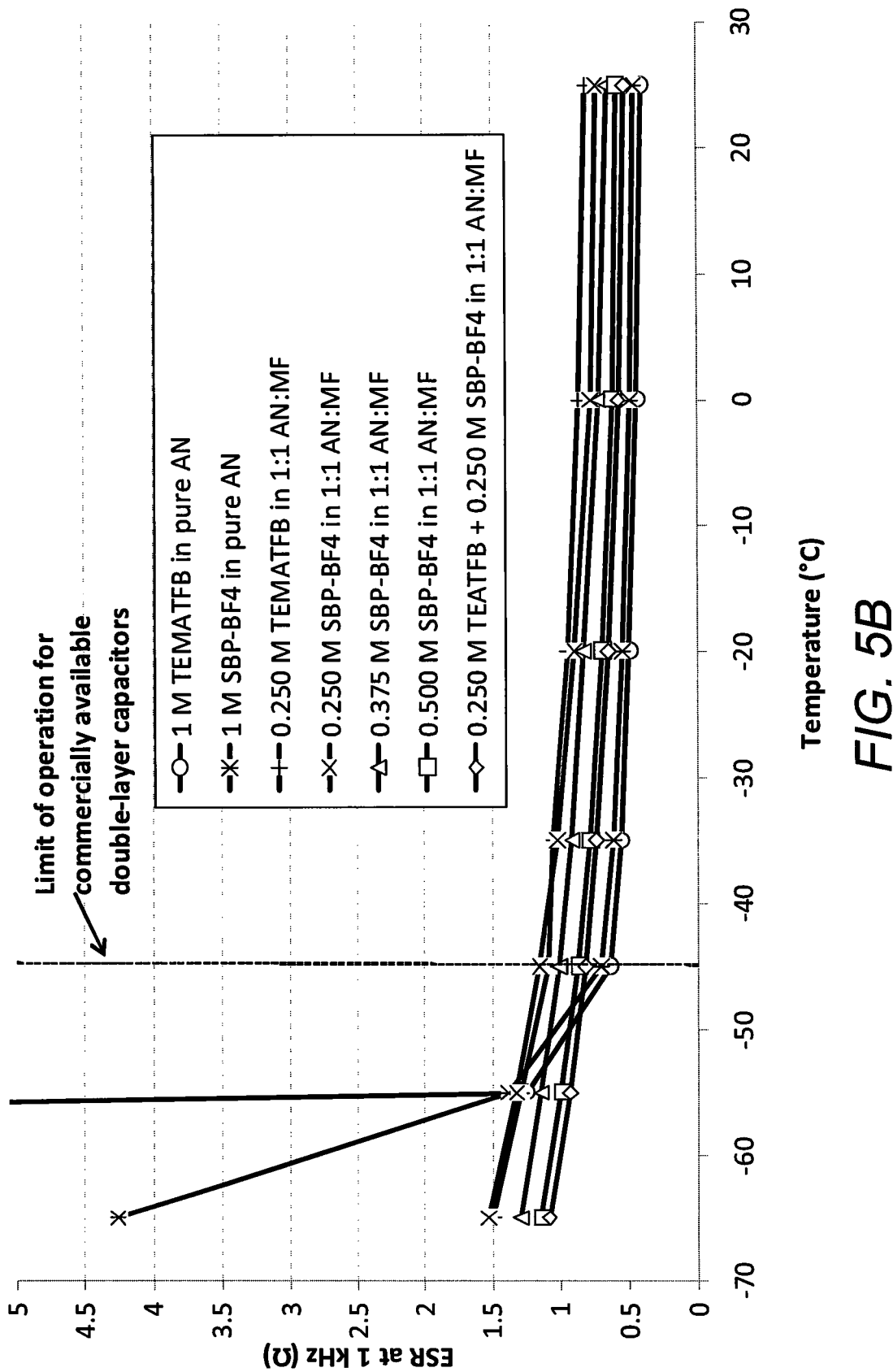
FIG. 5B is a plot of ESR versus temperature for a representative modified low temperature electrolyte using asymmetric and spiro-type quaternary ammonium salts.

FIG. 5B, shows a plot of ESR versus temperature for a representative modified low temperature electrolyte using example asymmetric and spiro-type quaternary ammonium salts. Some example cells are filled with the baseline electrolyte (1 M TEMATFB in AN) and display a low ESR (e.g. less than 1Ω) between 25° C. and −45° C. Beyond this limit, however, the ESR rises rapidly, with the cell essentially no longer behaving as a double-layer capacitor. However, example cells filled with a modified system (0.250 M TEMATFB in 1:1 AN:MF) are operational below −45° C., and display a low ESR relative to the baseline cell down to at least −65° C.

As shown in FIG. 5B, the ESR of an exemplary cell filled with a baseline electrolyte of 1 M $SBPBF_4$ in pure AN increases significantly below −45° C. However, exemplary cells using the 1:1 AN:MF solution with the $SBPBF_4$ salt in the concentration range of 0.250 to 0.500 M are operational below −45° C. and exhibit a low ESR relative to the baseline cell down to at least −65° C. Another exemplary cell featuring the 1:1 AN:MF electrolyte solution with a salt mixture of 0.250 M TEATFB and 0.250 M $SBPBF_4$ exhibits the lowest ESR of the example group below −45° C.

6. Double-Layer Capacitor Design and Production

As described in the previous sections, the addition of one or more various cosolvents to the basic acetonitrile formulation can enable near room temperature double-layer capacitance at temperatures below −45° C., for the basic coin cell configuration reported herein. In some cases, discharge as low as −80° C. is possible. One key challenge to developing a suitable double-layer capacitor is maintaining a sufficiently low ESR as demonstrated by the described embodiments of the invention. As seen in FIG. 4, by choice of appropriate salt concentration, an acceptable ESR can be achieved over a wide range of temperatures.

Those skilled in the art will appreciate that that an alternate base solvent such as propylene carbonate may also be used in further embodiments of the invention. Propylene carbonate is often chosen for manufacturing reasons, however, the performance in terms of increased ESR will be poorer, relative to cells employing acetonitrile as the base solvent. As a general proposition based on the results of the specific electrolyte solutions described, a double-layer capacitor embodiment of the invention comprises an electrolyte solution including a base solvent and a cosolvent for reducing a melting point of the base solvent. Although base solvents will typically comprise either acetonitrile (AN), or propylene carbonate (having higher melting points), a valid combination of base solvent and cosolvent (based on relative freezing temperatures) may be made by combining any of acetonitrile (AN), propylene carbonate, methyl formate (MF), ethyl acetate (EA), methyl acetate (MA), propionitrile (PN), butyronitrile (BN), and 1,3-dioxolane (DX).

Ionic compounds such as tetraethylammonium tetrafluoroborate may serve as suitable salts for the electrolyte solution. Any other ionic compounds with suitable solubility, electrochemical window, and chemical solubility may be similar employed. Examples include salts comprised of symmetric and asymmetric quaternary ammonium cations or alkali metal or alkaline earth metal cations such as lithium with tetrafluoroborate or hexafluorophosphate anions. Although salt concentrations in a wider range may be employed (typically 0.1 M to 1.5 M), improved performance may occur when the concentration of the salt is in the range of 0.10 M to 0.75 M. In addition, further refinements in this double-layer capacitor system (such as tailoring the pore geometry and nature of the salt) may further reduce this ESR even as will be understood by those skilled in the art.

Figure 6A:
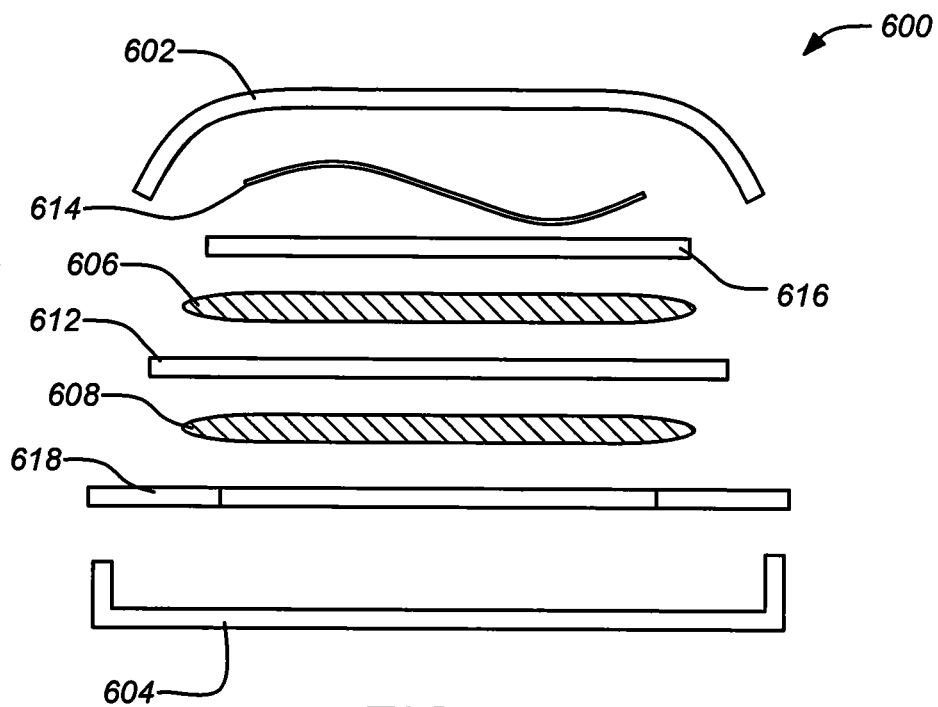
FIGS. 6A & 6B illustrate an exemplary double-layer capacitor embodiment of the invention in an exploded view and assembly view, respectively.
Figure 6B:
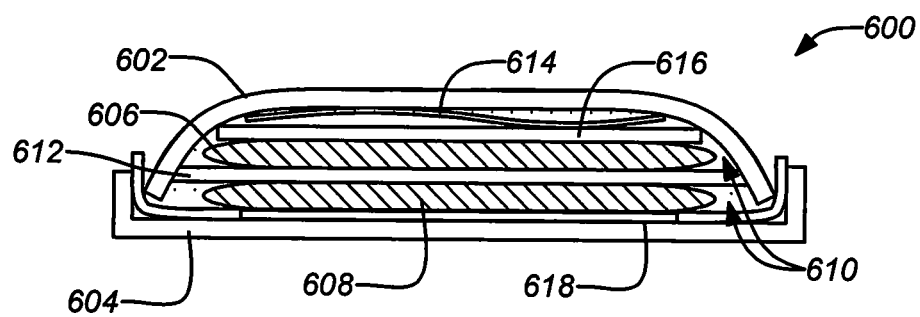

FIGS. 6A & 6B illustrate an exemplary double-layer capacitor 600 embodiment of the invention in an exploded view and assembly view, respectively. Function of the exemplary double-layer capacitor 600 is just as the principle described for conventional double-layer capacitor 100 described in FIG. 1. However, embodiments of the invention employ novel electrolyte solutions as previously described. The example double-layer capacitor 600 is housed in a coin cell case comprising an upper 602 (or lid) and a lower case 604 which are electrically insulated from each other when assembled. The upper case 602 is electrically coupled to a first porous electrode 606 for conducting a charge and the lower case 604 is electrically coupled to the second porous electrode 608 for conducting the opposing charge.

An electrolyte solution 610 is used to soak the two porous electrodes 606, 608 within the sealed upper and lower case 602, 604. The electrolyte solution 610 comprises a quaternary ammonium salt including at least one of triethylmethylammonium tetrafluoroborate (TEMATFB) and spiro-(1,1')-bipyrrolidium tetrafluoroborate (SBPBF$_4$) dissolved into at least a base solvent (e.g., acetonitrile (AN) or propylene carbonate) and a second solvent (e.g., methyl formate (MF), ethyl acetate (EA), methyl acetate (MA), propionitrile (PN), butyronitrile (BN), or 1,3-dioxolane (DX)) for reducing a melting point of the base solvent. When 1,3-dioxolane is employed as a cosolvent, approximately 2% by volume triethylamine (TEA) may be added to prevent acid catalyzed polymerization of the ether. The electrolyte solution 610 fills the interstices of the porous electrodes 606, 608.

A separator 612 is disposed between the first porous electrode 606 and the second porous electrode 608 within the sealed case. The separator 612 allows ionic conduction of the electrolyte solution 610 while also electrically insulating the first porous electrode 606 and the second porous electrode 608. As previously described with respect to FIG. 1, a dielectric interaction occurs between the charged surfaces of the porous electrodes 606, 608 and respective ions of the electrolyte solution 610.

The coin cell structure for the example double-layer capacitor 600 also includes a wave spring 614 and shim 616 between the upper case 602 and the first electrode 606 to apply proper pressure to the stack. In addition, a gasket 618 is used electrically insulate the upper 602 (or lid) and a lower case 604 from each other. It should be noted that although the example double-layer capacitor 600 is shown in a coin cell configuration, embodiments of the invention may be implemented using any known double-layer capacitor structural configuration as will be understood by those skilled in the art. For example, double-layer capacitors in accordance with the invention may also be produced as pouch cells, cylindrical cells and prismatic cells.

Figure 7:
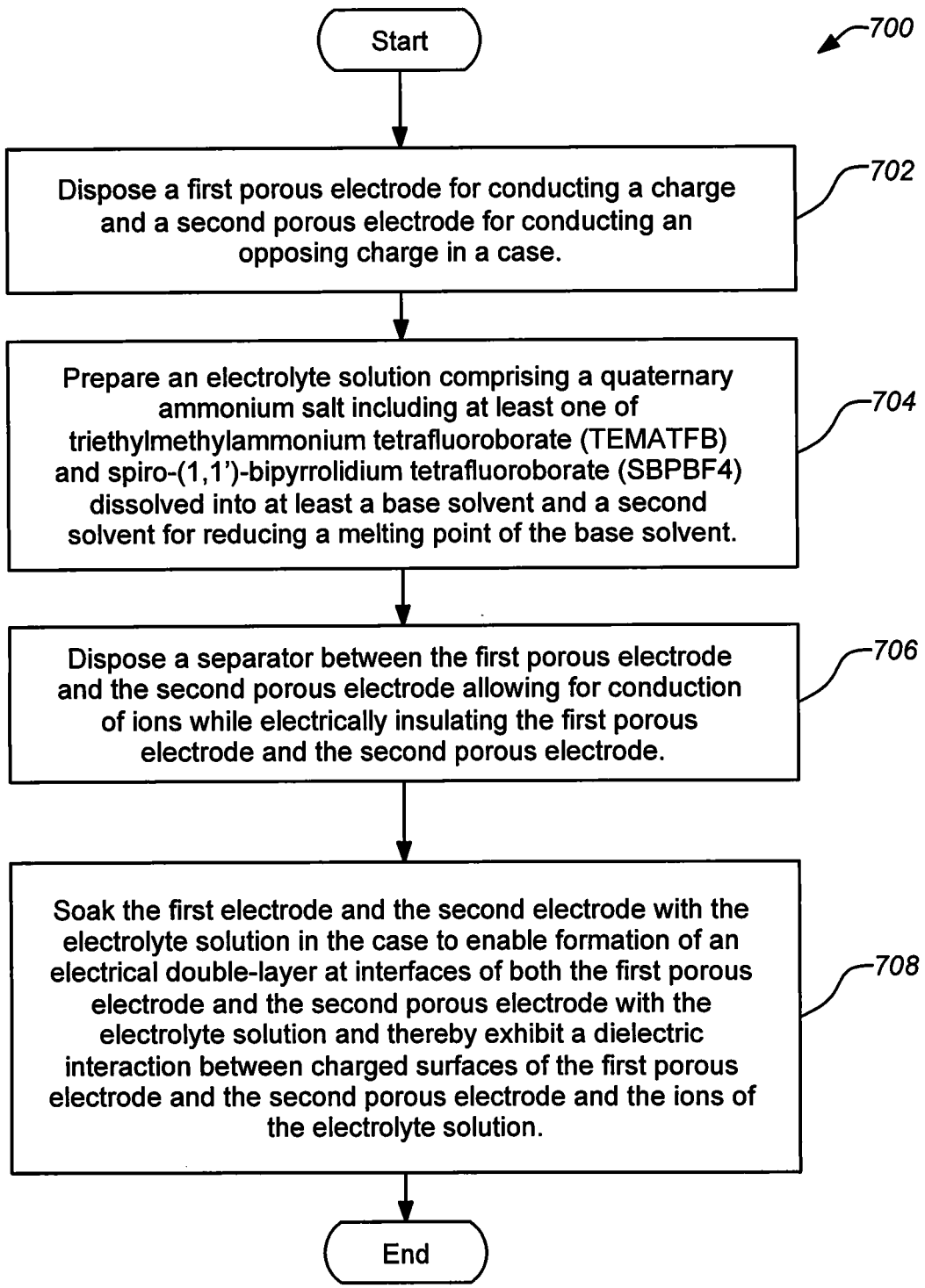
FIG. 7 is a flowchart of an exemplary method of producing a double-layer capacitor embodiment of the invention.

FIG. 7 is a flowchart of an exemplary method 700 of producing a double-layer capacitor. The method 700 begins with an operation 702 of disposing a first porous electrode for conducting a charge and a second porous electrode for conducting an opposing charge in a case. In operation 704, an electrolyte solution is prepared comprising a quaternary ammonium salt including at least one of triethylmethylammonium tetrafluoroborate (TEMATFB) and spiro-(1,1')-bipyrrolidium tetrafluoroborate (SBPBF$_4$) dissolved into at least a base solvent and a second solvent for reducing a melting point of the base solvent. In operation 706, a separator is disposed between the first porous electrode and the second porous electrode allowing for conduction of ions while electrically insulating the first porous electrode and the second porous electrode. In operation 708, the first electrode and the second electrode are soaked with the electrolyte solution in the case to enable formation of an electrical double-layer at interfaces of both the first porous electrode and the second porous electrode with the electrolyte solution and thereby exhibit a dielectric interaction between charged surfaces of the first porous electrode and the second porous electrode and the ions of the electrolyte solution.

Note that the order of operations of combining the electrodes, electrolyte solution and separator in the case may be altered as necessary to achieve the electrodes soaked with electrolyte solution within the case isolated from each other. Those skilled in the art will recognize manufacturing alternatives in order to achieve the desired goal. Similarly, those skilled in the art will recognize additional standard processes and/or sub-processes to be employed depending upon the particular cell type being employed. For example, cells are typically sealed from leakage of the electrolyte solution (e.g., as part of disposing the electrodes in the case). In addition, the method 700 may be further modified consistent with the apparatus embodiments previously described. Other cell types may be similarly employed, including cylindrical, pouch and prismatic cells.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:
1. An apparatus, comprising:
a first porous electrode for conducting a charge;
a second porous electrode for conducting an opposing charge;
an electrolyte solution soaking the first electrode and the second electrode to enable formation of an electrical double-layer at interfaces of both the first porous electrode and the second porous electrode with the electrolyte solution and thereby exhibit a dielectric interaction between charged surfaces of the first porous electrode and the second porous electrode and ions of the electrolyte solution; and a separator disposed between the first porous electrode and the second porous electrode, the separator allowing for conduction of the ions while electrically insulating the first porous electrode and the second porous electrode;

wherein the electrolyte solution comprises a quaternary ammonium salt including at least one of triethylmethylammonium tetrafluoroborate (TEMATFB) and spiro-(1,1')-bipyrrolidium tetrafluoroborate ($SBPBF_4$) dissolved into at least a base solvent and a second solvent for reducing a melting point of the base solvent.

2. The apparatus of claim 1, wherein the quaternary ammonium salt comprises a mixture of TEMATFB and $SBPBF_4$.

3. The apparatus of claim 1, wherein the base solvent comprises acetonitrile (AN) and the second solvent comprises a cosolvent selected from the group consisting of an organic carbonate, ether, an ester, a formate or a substituted nitrile.

4. The apparatus of claim 1, wherein the quaternary ammonium salt comprises a molarity concentration of substantially 0.10 M to substantially 0.75 M in the electrolyte solution.

5. The apparatus of claim 1, wherein the base solvent and the second solvent are each selected from the cosolvents consisting of acetonitrile (AN), methyl formate (MF), ethyl acetate (EA), methyl acetate (MA), propionitrile (PN), butyronitrile (BN), and 1,3-dioxolane (DX).

6. The apparatus of claim 1, wherein the second solvent comprises 1,3-dioxolane (DX) and the electrolyte solution further comprises triethylamine (TEA).

7. The apparatus of claim 1, wherein the electrolyte solution comprises substantially a 30% to a 70% base solvent volume.

8. The apparatus of claim 1, wherein at least one of the first porous electrode and the second porous electrode comprise a carbon material.

9. A method of producing a double-layer capacitor, comprising:

disposing a first porous electrode for conducting a charge and a second porous electrode for conducting an opposing charge in a case;

preparing an electrolyte solution comprising a quaternary ammonium salt including at least one of triethylmethylammonium tetrafluoroborate (TEMATFB) and spiro-(1,1')-bipyrrolidium tetrafluoroborate ($SBPBF_4$) dissolved into at least a base solvent and a second solvent for reducing a melting point of the base solvent;

disposing a separator between the first porous electrode and the second porous electrode, the separator allowing for conduction of ions while electrically insulating the first porous electrode and the second porous electrode; and soaking the first electrode and the second electrode with the electrolyte solution in the case to enable formation of an electrical double-layer at interfaces of both the first porous electrode and the second porous electrode with the electrolyte solution and thereby exhibit a dielectric interaction between charged surfaces of the first porous electrode and the second porous electrode and the ions of the electrolyte solution.

10. The method of claim 9, wherein the quaternary ammonium salt comprises a mixture of TEMATFB and $SBPBF_4$.

11. The method of claim 9, wherein the base solvent comprises acetonitrile (AN) and the second solvent comprises a cosolvent selected from the group consisting of an organic carbonate, ether, an ester, a formate or a substituted nitrite.

12. The method of claim 9, wherein the quaternary ammonium salt comprises a molarity concentration of substantially 0.10 M to substantially 0.75 M in the electrolyte solution.

13. The method of claim 9, wherein the base solvent and the second solvent are each selected from the cosolvents consisting of acetonitrile (AN), methyl formate (MF), ethyl acetate (EA), methyl acetate (MA), propionitrile (PN), butyronitrile (BN), and 1,3-dioxolane (DX).

14. The method of claim 9, wherein the second solvent comprises 1,3-dioxolane (DX) and the electrolyte solution further comprises triethylamine (TEA).

15. The method of claim 9, wherein the electrolyte solution comprises substantially a 30% to a 70% base solvent volume.

16. The method of claim 9, wherein at least one of the first porous electrode and the second porous electrode comprise a carbon material.

17. An apparatus, comprising:

a first porous electrode means for conducting a charge;

a second porous electrode means for conducting an opposing charge;

an electrolyte solution means for soaking the first electrode means and the second electrode means to enable formation of an electrical double-layer at interfaces of both the first porous electrode means and the second porous electrode means with the electrolyte solution means and thereby exhibit a dielectric interaction between charged surfaces of the first porous electrode means and the second porous electrode means and ions of the electrolyte solution means; and a separator means disposed between the first porous electrode means and the second porous electrode means, the separator means for allowing conduction of the ions while electrically insulating the first porous electrode means and the second porous electrode means;

wherein the electrolyte solution means comprises a quaternary ammonium salt including at least one of triethylmethylammonium tetrafluoroborate (TEMATFB) and spiro-(1,1')-bipyrrolidium tetrafluoroborate ($SBPBF_4$) dissolved into at least a base solvent and a second solvent means for reducing a melting point of the base solvent.

18. The apparatus of claim 17, wherein the quaternary ammonium salt comprises a mixture of TEMATFB) and $SBPBF_4$.

19. The apparatus of claim 17, wherein the quaternary ammonium salt comprises a molarity concentration of substantially 0.10 M to substantially 0.75 M in the electrolyte solution.

20. The apparatus of claim 17, wherein the electrolyte solution means comprises substantially a 30% to a 70% base solvent volume.

* * * * *